(12) United States Patent
Hikimura et al.

(10) Patent No.: US 7,245,568 B2
(45) Date of Patent: Jul. 17, 2007

(54) DISK RECORDING AND REPRODUCING DEVICE

(75) Inventors: Akira Hikimura, Kanagawa (JP); Kunihiko Kodama, Kanagawa (JP); Tomoe Nishimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 10/679,492

(22) Filed: Oct. 7, 2003

(65) Prior Publication Data

US 2004/0179444 A1 Sep. 16, 2004

(30) Foreign Application Priority Data

Mar. 10, 2003 (JP) .............................. 2003-063888

(51) Int. Cl.
*G11B 19/02* (2006.01)
(52) U.S. Cl. ................ 369/47.3; 369/47.28; 369/53.34
(58) Field of Classification Search ............... 369/47.3, 369/47.28, 53.34
See application file for complete search history.

(56) References Cited

U.S. PATENT DOCUMENTS

| 6,101,158 | A  | * | 8/2000  | Hogan ........................ 369/47.3 |
| 6,128,262 | A  | * | 10/2000 | DeCusatis et al. ........ 369/53.34 |
| 6,201,778 | B1 | * | 3/2001  | Sensyu ..................... 369/53.34 |
| 6,269,059 | B1 | * | 7/2001  | Kuroda et al. ........... 369/47.28 |
| 6,631,104 | B2 | * | 10/2003 | Kuroda et al. ........... 369/47.28 |
| 2002/0012299 | A1 | * | 1/2002 | Asano ..................... 369/47.19 |
| 2004/0179444 | A1 |   | 9/2004 | Hikimura et al. |

FOREIGN PATENT DOCUMENTS

| JP | 08-249822   | 9/1996 |
| JP | 2000-57576  | 2/2000 |
| JP | 2000-173055 | 6/2000 |
| JP | 2002-056626 | 2/2002 |
| JP | 2003-173535 | 6/2003 |

OTHER PUBLICATIONS

U.S. Appl. No. 11/001,018, filed Dec. 2, 2004, Kodama.

* cited by examiner

*Primary Examiner*—Wayne Young
*Assistant Examiner*—LaTanya Bibbins
(74) *Attorney, Agent, or Firm*—Oblon, Spivak, McClelland, Maier & Neustadt, P.C.

(57) ABSTRACT

A disc recording and reproducing device disclosed herein comprises: a resuming section which resumes writing of record data; a first reproduction synchronization signal output section which reproduces the record data recorded on a recorded data region, sequentially extracts a synchronization signal from the reproduced record data, and outputs a first reproduction synchronization signal; a reliability judging section which only detects a frame having a period in accordance with a predetermined standard from the first reproduction synchronization signal, and outputs the frame as a reliability synchronization signal; a synchronization signal phase retaining section which outputs a retained phase signal that retains a phase of the frame of the reliability synchronization signal; a second reproduction synchronization signal output section which reproduces the record data recorded on an additional data region, sequentially extracts the synchronization signal, and outputs a second reproduction synchronization signal; and a phase difference measuring section which measures a displacement of frames between the second reproduction synchronization signal and the retained phase signal.

20 Claims, 17 Drawing Sheets

DISK RECORDING AND REPRODUCING DEVICE

CROSS REFERENCE TO RELATED APPLICATION

This application claims benefit of priority under 35 U.S.C. § 119 to Japanese Patent Application No. 2003-063888, filed on Mar. 10, 2003, the entire contents of which are incorporated by reference herein.

BACKGROUND OF THE INVENTION

1. Field of the Invention

The present invention relates to a disc recording and reproducing device, and particularly relates to a disc recording and reproducing device capable of additionally recording, after recording of record data on a disc is once interrupted, record data that is continuous to the record data written just before the interruption.

2. Description of the Related Art

A recordable CD disc, DVD disc or the like before recording is a substrate on which only guide grooves for guiding a laser beam are formed, and an irradiation of a high-power laser beam on the guide grooves causes a reflective transformation in a recording film on the substrate. Record data such as sound data, image data or the like can thus be recorded on a CD disc, a DVD disc or the like, and this recorded record data can be reproduced by a reproducing device.

When recording data on such a recordable disc, for example, a disc recording and reproducing device installed in a personal computer or the like is used. In such a disc recording and reproducing device, record data to be recorded is stored in a buffer once, and this record data stored in the buffer is sequentially recorded at a predetermined rate on the disc.

However, the personal computer or the like performs various processings besides storing record data in the buffer of the disc recording and reproducing device, and it is possible that the buffer becomes empty for some reason and the recording of record data on the disc is interrupted. This phenomenon is generally referred to as "buffer under-run." When this buffer under-run occurs and the recording is aborted at this point, recording on a CD-R (CD-Recordable) or the like, which is capable of recording only once, is terminated incompletely and the subsequent recording cannot be carried out, so that this CD-R is wasted.

Accordingly, among the disc recording and reproducing devices, there exists a type that detects the end of recorded data on a disc after recording of the record data on the disc is once interrupted, and is capable of resuming writing of record data, which is continuous to the recorded data that is written just before the interruption, at an unrecorded region just after the end of the recorded data. Here, the disc recording and reproducing device of this type is referred to as a disc recording and reproducing device capable of recording interruption and resumption.

In such a disc recording and reproducing device capable of recording interruption and resumption, a displacement may occur between a phase of a reproduction synchronization signal in a recorded data region and a phase of a reproduction synchronization signal in an additional data region. Accordingly, Japanese Patent Application No. 2001-368102 (Japanese Patent Laid-open No. 2003-173535: hereinafter, referred to as patent document 1) discloses a technique for estimating in advance the displacement of the phases of both signals and compensating the displacement when actually resuming recording of record data that is interrupted.

Specifically, as shown in FIG. 1 to FIG. 3, a synchronization signal phase measuring section 32 is provided in the disc recording and reproducing device, and a synchronization signal phase measuring section 32 measures a phase of a reproduction synchronization signal that is a reproduced synchronization signal, so that a connection state between recorded data and additional data is judged from a measurement result of the phase of the reproduction synchronization signal in order to obtain a correction value (error amount) for a correct connection state. Then, a generation timing and a recording resumption timing of record data are controlled so as to compensate the obtained error amount. Measurement of such a correction value (error amount) is, for example, performed using a test writing region of a disc.

However, the technique of the patent document 1 has a problem that, when the reproduction synchronization signal is disturbed (displaced or undetected) due to various external disturbance (in rotation control of a disc by a displacement or flaw of the disc or the like), the disturbed reproduction synchronization signal is used to measure an displacement of the phase, so that the phase difference displaced due to actual recording operation cannot be measured stably.

SUMMARY OF THE INVENTION

In order to accomplish the aforementioned and other objects, according to one aspect of the present invention, a disc recording and reproducing device, comprises:

a resuming section which resumes, after writing of record data on a disc is interrupted, writing of the record data, which is continuous to the record data of which writing is interrupted, at an additional data region just after an end of a recorded data region that is a region of the record data already recorded on the disc;

a first reproduction synchronization signal output section which reproduces the record data recorded on the recorded data region, sequentially extracts a synchronization signal from the reproduced record data, and outputs a first reproduction synchronization signal with a frame having a predetermined length that is sequentially structured by the sequentially extracted synchronization signal;

a reliability judging section which only detects a frame having a period that is in accordance with a predetermined standard from the first reproduction synchronization signal, and outputs the frame as a reliability synchronization signal;

a synchronization signal phase retaining section which outputs, based on the frame contained in the reliability synchronization signal, a retained phase signal that retains a phase of the frame of the reliability synchronization signal;

a second reproduction synchronization signal output section which reproduces the record data recorded on the additional data region, sequentially extracts the synchronization signal from the reproduced record data, and outputs a second reproduction synchronization signal with a frame having a predetermined length that is sequentially structured by the sequentially extracted synchronization signal; and a phase difference measuring section which measures a displacement of frames between the second reproduction synchronization signal and the retained phase signal, as a phase difference.

According to another aspect of the present invention, a disc recording and reproducing device, comprises:

a resuming section which resumes, after writing of record data on a disc is interrupted, writing of the record data, which is continuous to the record data of which writing is interrupted, at an additional data region just after an end of a recorded data region that is a region of the record data already recorded on the disc;

a first reproduction synchronization signal output section which reproduces the record data recorded on the recorded data region, sequentially extracts a synchronization signal from the reproduced record data, and outputs a first reproduction synchronization signal with a frame having a predetermined length that is sequentially structured by the sequentially extracted synchronization signal;

a data reliability judging section which only detects a frame containing reliable record data from the first reproduction synchronization signal, and outputs the frame as a reliability synchronization signal;

a synchronization signal phase retaining section which outputs, based on the frame contained in the reliability synchronization signal, a retained phase signal that retains a phase of the frame;

a second reproduction synchronization signal output section which reproduces the record data recorded on the additional data region, sequentially extracts a synchronization signal from the reproduced record data, and outputs a second reproduction synchronization signal with a frame having a predetermined length that is sequentially structured by the sequentially extracted synchronization signal; and a phase difference measuring section that measures a displacement of frames between the second reproduction synchronization signal and the retained phase signal, as a phase difference.

According to another aspect of the present invention, a disc recording and reproducing device, comprises:

a resuming section which resumes, after writing of record data on a disc is interrupted, writing of the record data, which is continuous to the record data of which writing is interrupted, at an additional data region just after an end of a recorded data region that is a region of the record data already recorded on the disc;

a first reproduction synchronization signal output section which reproduces the record data recorded on the recorded data region, sequentially extracts a synchronization signal from the reproduced record data, and outputs a first reproduction synchronization signal with a frame having a predetermined length that is sequentially structured by the sequentially extracted synchronization signal;

a synchronization signal phase retaining section which outputs, based on the frame contained in the first reproduction synchronization signal, a retained phase signal that retains a phase of the frame;

a second reproduction synchronization signal output section which reproduces the record data recorded on the additional data region, sequentially extracts a synchronization signal from the reproduced record data, and outputs a second reproduction synchronization signal with a frame having a predetermined length that is sequentially structured by the sequentially extracted synchronization signal; and a phase difference measuring section which measures a displacement of frames between the second reproduction synchronization signal and the retained phase signal as a phase difference, after a predetermined period is passed after the reproduction of the record data recorded on the additional data region is started.

DESCRIPTION OF THE PREFERRED EMBODIMENTS

First Embodiment

A disc recording and reproducing device according to this embodiment is obtained by additionally providing a conventional disc recording and reproducing device with a synchronization signal reliability judging section and a synchronization signal phase measuring section. The synchronization signal reliability judging section judges reliability of a reproduction synchronization signal. The synchronization signal phase measuring section measures a difference between a phase of a retained phase signal that is generated based on a reliable reproduction synchronization signal and a phase of a reproduction synchronization signal that is obtained by reproducing an additional data region. This disc recording and reproducing device is configured to judge a connection state between recorded data and additional data according to a measurement result of the phase of the reproduction synchronization signal, and control a generation timing and a recording resumption timing of record data so as to compensate an error amount for a correct connection state. More details thereof will be explained below.

Figure 4:
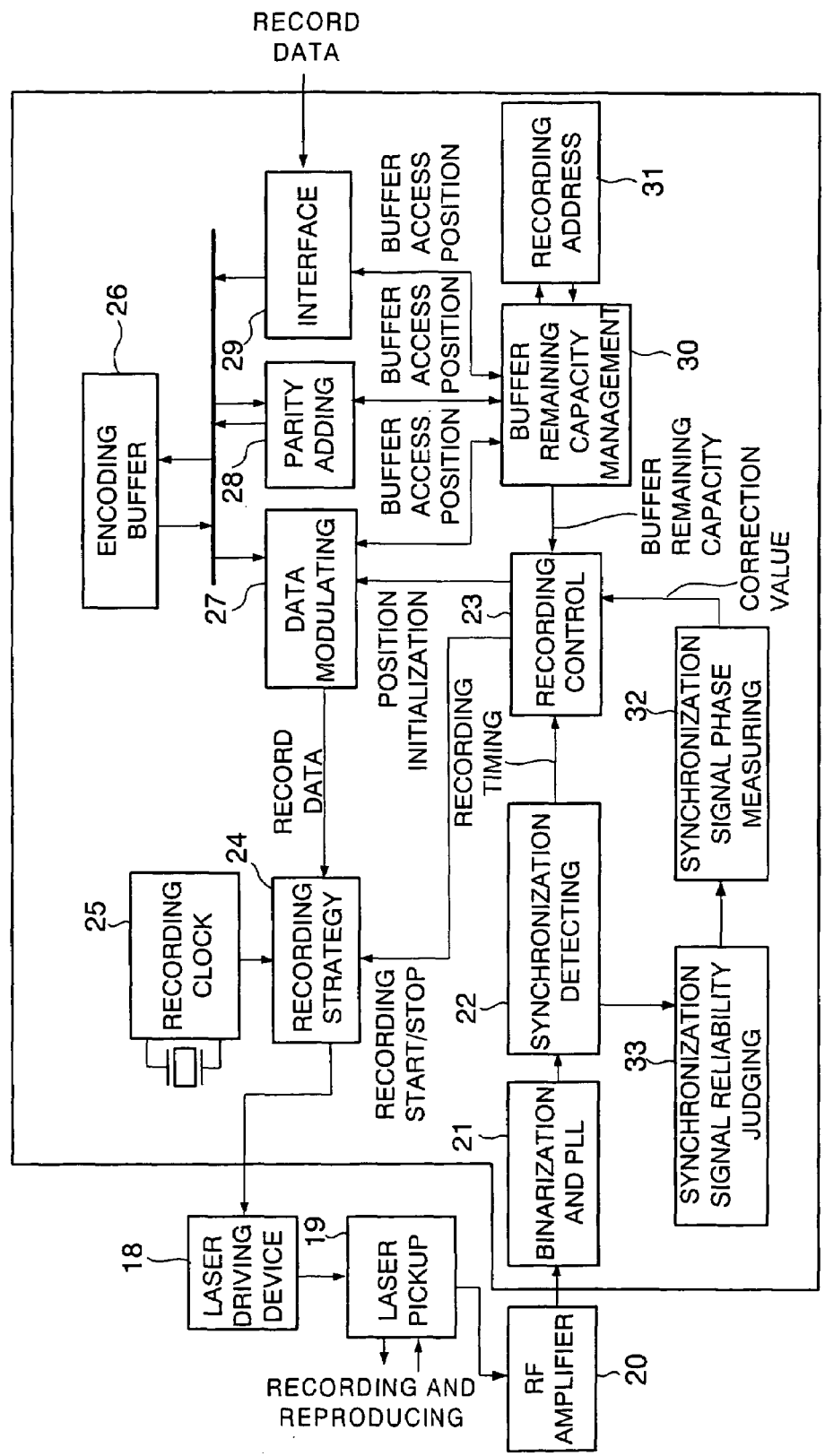
FIG. 4 is a schematic block diagram explaining the configuration of a disc recording and reproducing device according to a first embodiment.

FIG. 4 is a block diagram explaining the configuration of the disc recording and reproducing device according to this embodiment. As can be understood from FIG. 4, the disc recording and reproducing device according to this embodiment is configured by adding a synchronization signal reliability judging section 33 to a disc recording and reproducing device shown in FIG. 1.

As the overall operation, record data recorded on a disc is reproduced by a laser pickup 19, and the reproduction signal thereof is amplified by an RF amplifier 20. The amplified reproduction signal is AD-converted by a binarization and PLL circuit 21. Thereafter, a synchronization detecting section 22 generates a reproduction synchronization signal of the reproduced record data. This reproduction synchronization signal is inputted to a recording control section 23 as record timing data.

The recording control section 23 performs a timing control for re-recording additional data by the inputted record timing. Phase initializing data having this timing information is inputted to a data modulating section 27, and the timing thereof is synchronized with record data inputted from a buffer 26 in order to generate additional data. This additional data is then additionally recorded on the disc via a recording strategy section 24, a laser driving device 18 and the laser pickup 19.

A recording clock 25 generates a basic operation clock at this time. Record data is inputted from a personal computer or the like to an interface section 29, and this inputted record data is stored in the buffer 26. A parity adding section 28 adds a parity bit to the record data to be recorded. A recording address section 31 manages addresses to be recorded on a disc. A buffer remaining capacity management section 30 manages record data remaining in the buffer 26 and controls the data so as not to run out of the data in the middle of writing.

Figure 5:
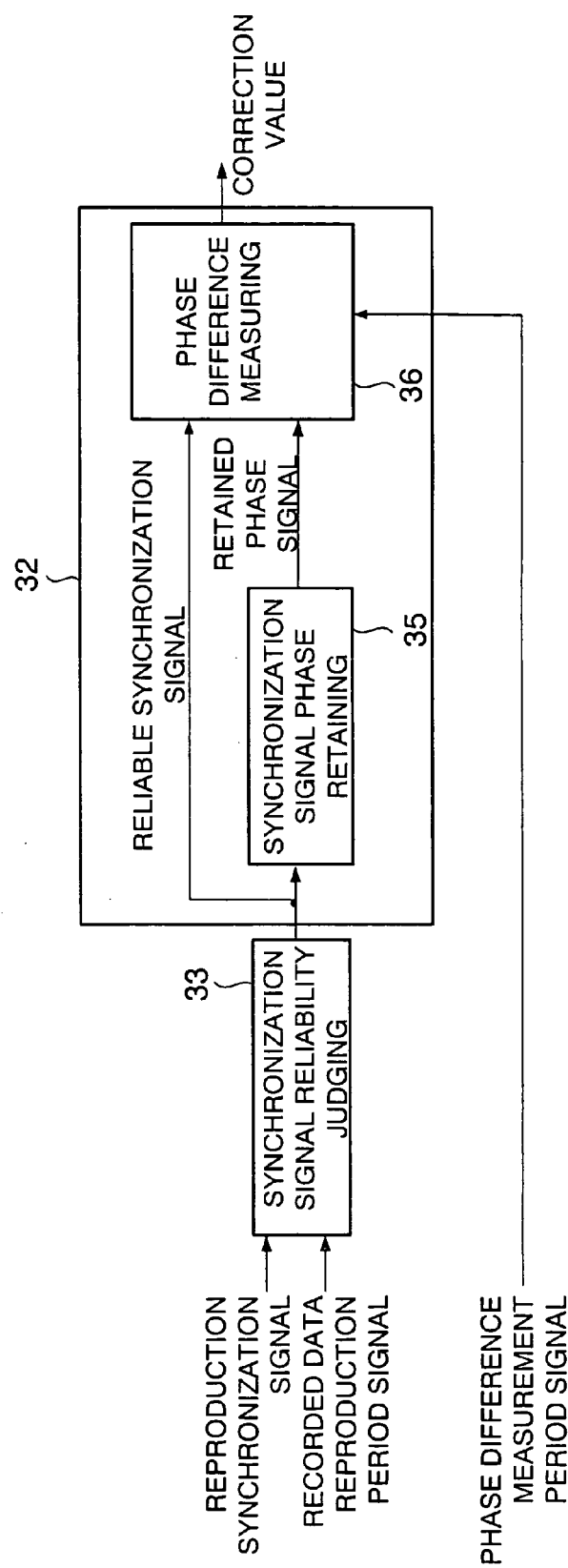
FIG. 5 is a block diagram explaining the configuration of a synchronization signal phase measuring section of FIG. 4.

FIG. 5 is a block diagram showing in more details the configuration of the synchronization signal phase measuring section 32 and signals inputted to this synchronization signal phase measuring section 32 and to the synchronization signal reliability judging section 33.

As shown in FIG. 5, to the synchronization signal reliability judging section 33, the reproduction synchronization signal obtained by generating a recorded data region and an additional data region is inputted. Further, to this synchronization signal reliability judging section 33, a recorded data reproduction period signal that is a signal for indicating either it is in a period of reproducing the recorded data or in a period of reproducing the additional data region is also inputted.

The synchronization signal reliability judging section 33 outputs, only when the reproduction synchronization signal with a frame having a length that corresponds to a standard is detected from the inputted reproduction synchronization signals for a predetermined number of times, the reproduction synchronization signal to a synchronization signal phase retaining section 35 and to a phase difference measuring section 36. The predetermined number of times is once, twice, or the like for example. In this embodiment, the standard for the length of the frame of the synchronization signal is defined by the number of bits. In the case of a CD for example, when information of 588 bits can be obtained, it is judged that the length of the frame is in accordance with the standard. Also, when there is a plurality of standards for the length of the frame, it is judged that the synchronization signal has a frame with a length in accordance with the standard when the length corresponds to any one of the plurality of the standards.

The synchronization signal phase retaining section 35 included in the synchronization signal phase measuring section 32 retains a phase of a reproduction synchronization signal, which is inputted during the reproduction period of a recorded data region, even after the reproduction of an additional data region is started, and outputs the phase as a retained phase signal to the phase difference measuring section 36. At this time, the synchronization signal phase retaining section 35 defines a phase of the reproduction synchronization signal of the recorded data region, based on the frame that is judged by the synchronization signal reliability judging section 33 as the frame having the length in accordance with the standard.

The phase difference measuring section 36 included in the synchronization signal phase measuring section 32 compares the phase of the reproduction synchronization signal inputted during the reproduction period of the additional data region with a phase of the retained phase signal inputted from the synchronization signal phase retaining section 35 and outputs phase difference information thereof as a correction value. Whether it is in the reproduction period of the additional data region or not is determined based on a phase difference measurement period signal.

Figure 6:
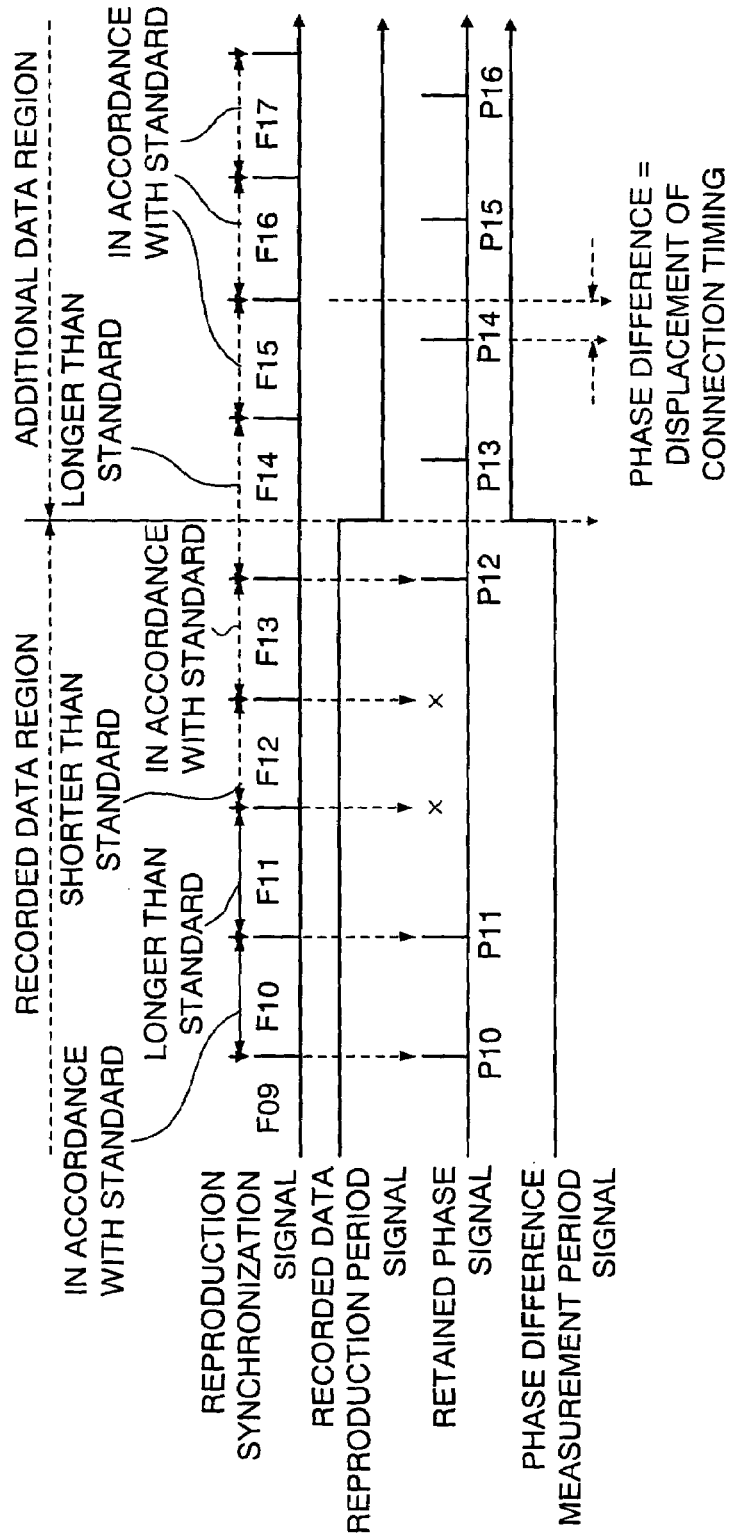
FIG. 6 is a diagram showing one example of operational waveforms of signals inputted to/outputted from a synchronization signal reliability judging section and the synchronization signal phase measuring section of FIG. 5.

FIG. 6 is a diagram showing one example of a signal timing chart for explaining operation contents of these synchronization signal reliability judging section 33 and synchronization signal phase measuring section 32. As shown in FIG. 6, even in a reproduction synchronization signal obtained by reproducing a recorded data region, disturbance may occur in its phase. Specifically, there may be a frame having a length longer than a defined standard or a frame having a length shorter than the defined standard. Accordingly, in this embodiment, even in the reproduction synchronization signal obtained by reproducing the recorded data region, the frame having the length that is not in accordance with the standard is eliminated by the synchronization signal reliability judging section 33.

In the example of FIG. 6, frames F10 and F13 have lengths in accordance with the standard, but the frames F11 and F12 do not have the lengths in accordance with the standard. Accordingly, the synchronization signal reliability judging section 33 outputs pulses P10 and P11 to the synchronization signal phase measuring section 32 at the end of a frame F09 and at the end of the frame F10 respectively. In response to that, the synchronization signal phase retaining section 35 also outputs pulses P10 and P11 of the retained phase signal. On the other hand, the synchronization signal reliability judging section 33 does not output a pulse at the end of the frame F11 and at the end of the frame F12. Consequently, the synchronization signal phase retaining section 35 does not output pulses of the retained phase signal.

A frame F13 subsequent to the frame F12 has a length in accordance with the standard, so that the synchronization signal reliability judging section 33 outputs a pulse P12 at the end of the frame F13. Accordingly, the synchronization signal phase retaining section 35 outputs a pulse P12 of the retained phase signal.

When the reproduction of the additional data region is started, the phase difference measurement period signal is switched from a low level to a high level. Accordingly, the synchronization signal phase retaining section 35 forcibly outputs the retained phase signal with its frame having the same length as that of the frame up to this point. In other words, pulses P13, P14, P15, . . . are outputted with frames having the lengths defined by the frame F10.

The phase difference measuring section 36 judges whether or not the frame having the length in accordance with the standard is detected for a predetermined number of times. When the frame having the length in accordance with the standard is detected for the predetermined number of times (once in the example of FIG. 6), a displacement between the reproduction synchronization signal obtained by reproducing the additional data region and the retained phase signal from the synchronization signal phase retaining section 35 is measured. The phase difference measuring section 36 then outputs the measured displacement as the correction value to the recording control section 23.

The recording control section 23 adjusts, when performing additional recording of record data thereafter, a timing to write additional record data on the disc based on this correction value, and controls so as to prevent the displacement from occurring between the reproduction synchronization signal of the recorded data region and the reproduction synchronization signal of the additional data region.

As described above, in the disc recording and reproducing device according to this embodiment, when the interval of the synchronization signals used for measuring the phase difference between the reproduction synchronization signals of the recorded data region and the additional data region is the interval not in accordance with the standard, this interval is eliminated, so that reliability of detecting an error of the connection timing between the recorded data and the additional data can be increased. Furthermore, the generation timing and the recording resumption timing of record data can thus be stably corrected based on the measurement result.

For example, when the phase difference measuring device shown in FIG. 5 is operated by a reproduction channel bit clock, detection precision of the connection error is within ±1 channel bit. The channel bit clock frequency is proportional to a recording speed, so that the connection state of this embodiment can retain a constant grade without depending on the recording speed.

This embodiment can be used, for example, at a stage of designing a disc recording and reproducing device, as a means for precisely evaluating a connection state between the end of recorded data and the start of additional record data on a disc. Further, after performing a temporary interruption of recording and additional recording utilizing a test writing region for adjusting recording laser power, the phase difference measurement of protection synchronization signals of the recorded data region and the additional data region according to this embodiment can be performed to compensate a variation of a delay element due to characteristic dispersion of the device or variation of operating temperature.

Second Embodiment

In a second embodiment, record data reproduced from a disc is binarized, reliability of data after performing a data demodulation is judged, and a phase of a retained phase signal is defined based on a frame of a reproduction synchronization signal by which reliable data is obtained. More details thereof will be explained below.

Figure 7:
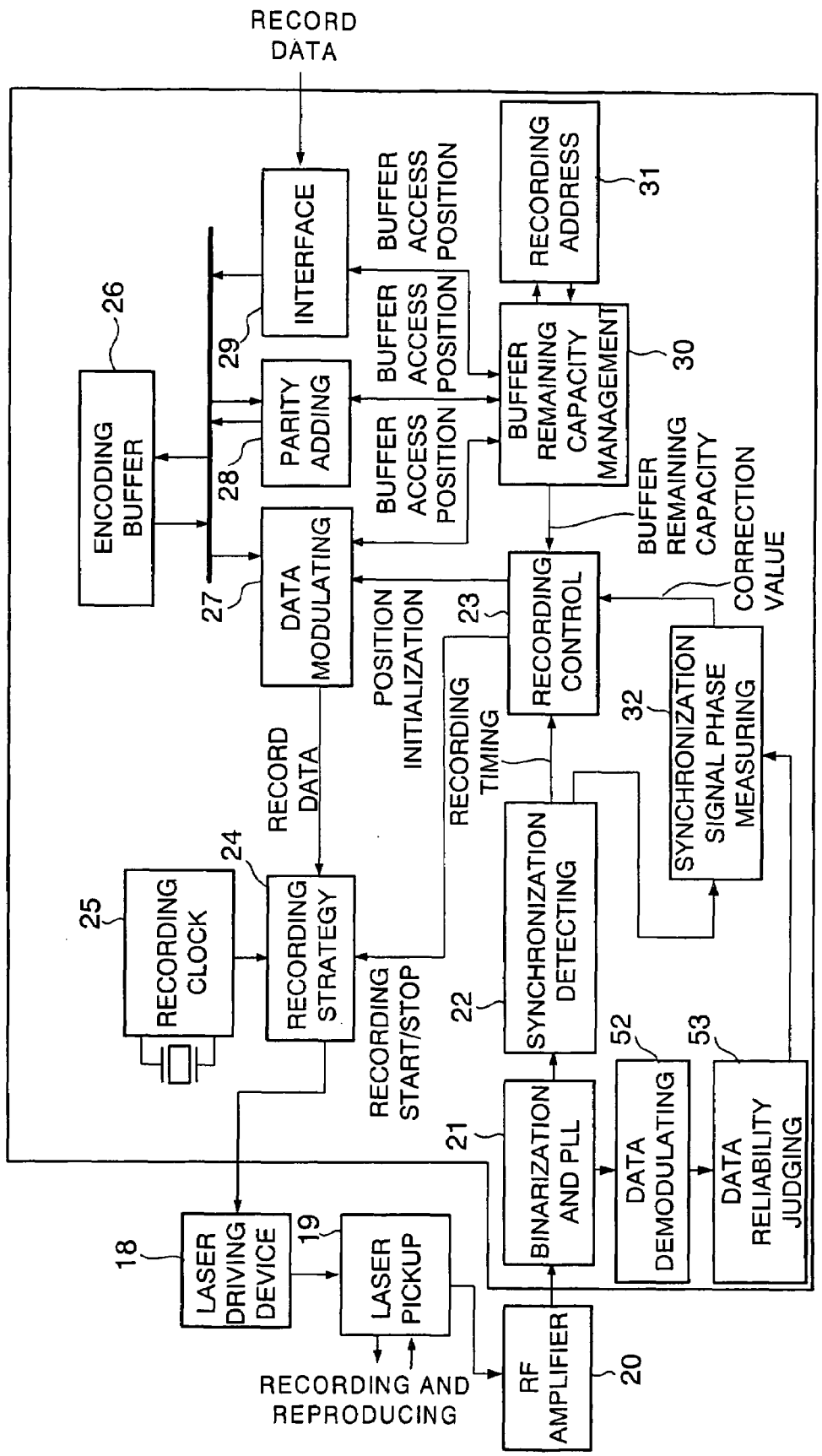
FIG. 7 is a schematic block diagram explaining the configuration of a disc recording and reproducing device according to a second embodiment.

FIG. 7 is a block diagram explaining the configuration of a disc recording and reproducing device according to this embodiment. As can be understood from FIG. 7, the disc recording and reproducing device according to this embodiment is configured by adding a data demodulating section 52 and a data reliability judging section 53 to the disc recording and reproducing device shown in FIG. 1.

Figure 8:
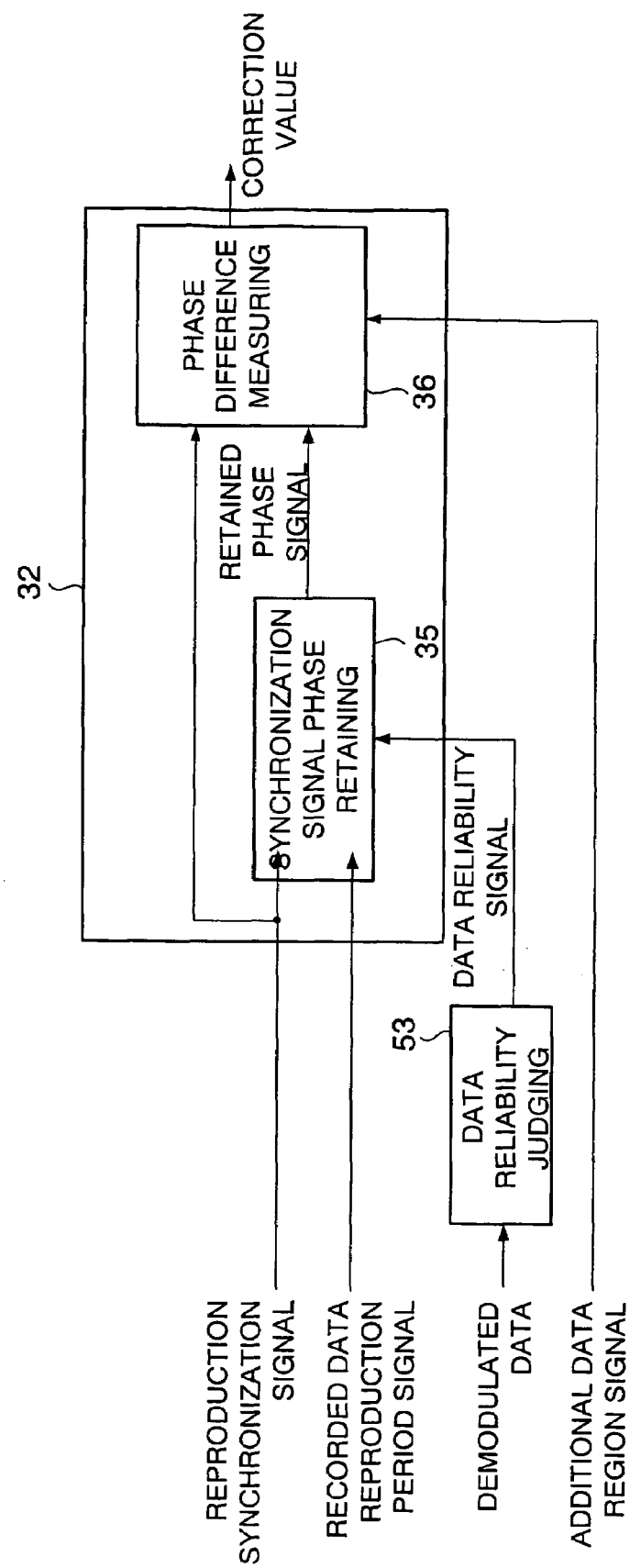
FIG. 8 is a block diagram explaining the configuration of a synchronization signal phase measuring section of FIG. 7.

FIG. 8 is a block diagram showing in more details the configuration of a synchronization signal phase measuring section 32 and signals inputted to this synchronization signal phase measuring section 32 and to a synchronization signal reliability judging section 33.

As shown in FIG. 8, to the data reliability judging section 53, demodulated data obtained by generating a recorded data region and an additional data region is inputted from the data demodulating section 52. The data reliability judging section 53 judges whether the inputted demodulated data is reliable as data or not. For example, a code error detection technique by a parity bit is used to judge whether the data has an error or not. The data reliability judging section 53 then outputs a data reliability signal indicating whether the demodulated data is reliable or not to a synchronization signal phase retaining section 35.

Further, to the synchronization signal phase retaining section 35, a reproduction synchronization signal and a recorded data reproduction period signal are also inputted. The synchronization signal reliability judging section 33 only extracts a frame containing reliable data from the inputted reproduction synchronization signal and eliminates a frame containing unreliable data.

Further, similarly to the above-described first embodiment, the synchronization signal phase retaining section 35 retains a phase of a reproduction synchronization signal, which is inputted during a reproduction period of a recorded data region, even after a reproduction of an additional data region is started, and outputs the phase as a retained phase signal to a phase difference measuring section 36.

The phase difference measuring section 36 compares the phase of the reproduction synchronization signal inputted during the reproduction period of the additional data region with the phase of the retained phase signal inputted from the synchronization signal phase retaining section 35, and outputs phase difference information thereof as a correction value. Whether it is in the reproduction period of the additional data region or not is judged based on a phase difference measurement period signal.

Figure 9:
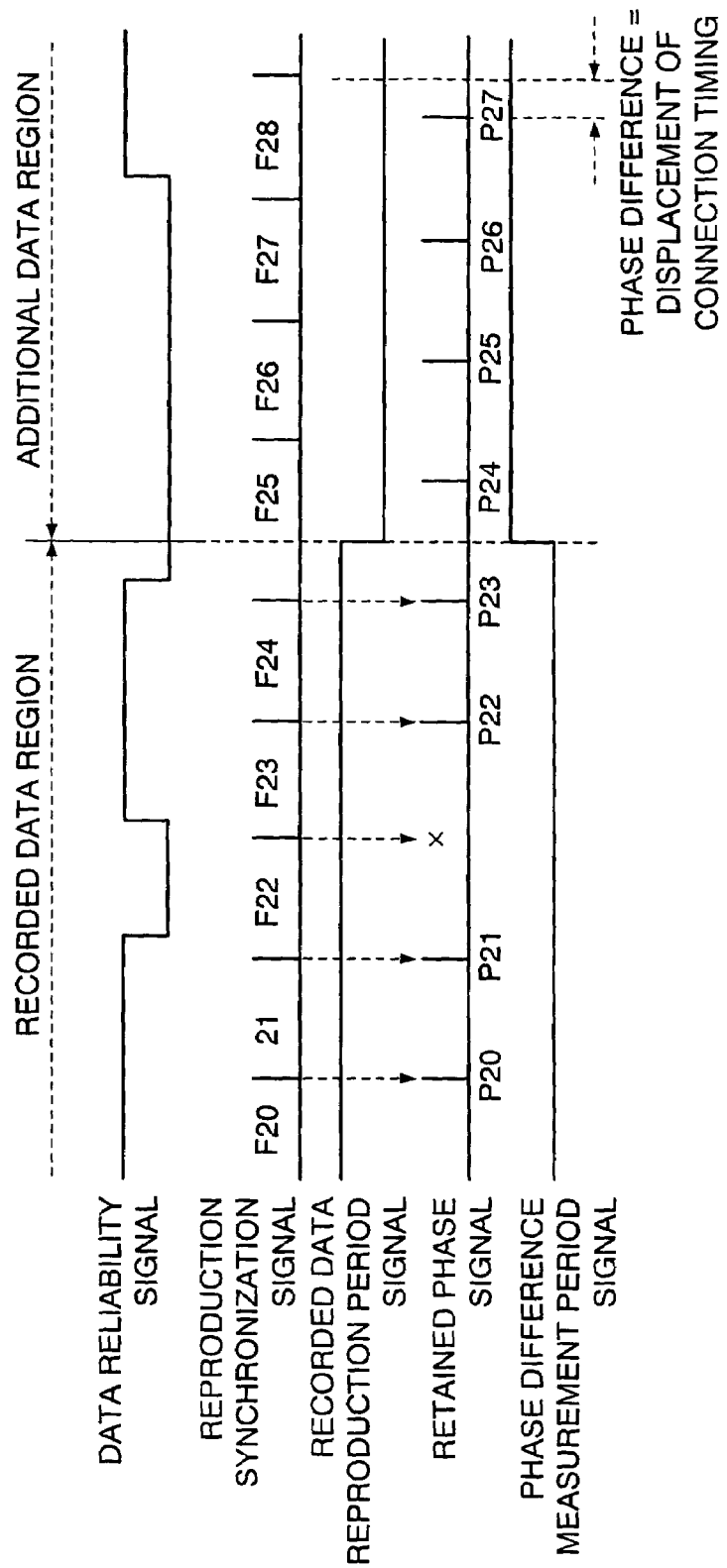
FIG. 9 is a diagram showing one example of operational waveforms of signals inputted to/outputted from a data reliability judging section and the synchronization signal phase measuring section of FIG. 8.

FIG. 9 is a diagram showing one example of a signal timing chart for explaining operation contents of these data reliability judging section 53 and synchronization signal phase measuring section 32. As shown in FIG. 9, even in a reproduction synchronization signal obtained by reproducing a recorded data region, there may be a frame including unreliable data. Accordingly, in this embodiment, even in the reproduction synchronization signal obtained by reproducing the recorded data region, the frame having the unreliable data is eliminated by the synchronization signal phase retaining section 35 based on a judgment of the data reliability judging section 53.

In the example of FIG. 9, frames F20 and F21 contain reliable data. Accordingly, the synchronization signal phase retaining section 35 outputs pulses P20 and P21 of the retained phase signal to the phase difference measuring section 36 at the end of the frame F20 and at the end of the frame F21 respectively.

On the other hand, a frame F22 contains unreliable data. Accordingly, the synchronization signal phase retaining section 35 does not output a pulse of the retained phase signal at the end of the frame F22.

Frames F23 and F24 subsequent to the frame F22 contains reliable data. Accordingly, the synchronization signal phase retaining section 35 outputs pulses P22 and P23 of the retained phase signal.

When the reproduction of the additional data region is started, the phase difference measurement period signal is switched from a low level to a high level. Accordingly, the synchronization signal phase retaining section 35 forcibly outputs the retained phase signal with its frame having the same length as that of the frame up to this point. In other words, pulses P24, P25, P26, . . . are outputted with frames having the length defined by the frame F24.

The phase difference measuring section 36 measures a displacement between the reproduction synchronization signal obtained by reproducing the additional data region and the retained phase signal from the synchronization signal phase retaining section 35. At this time, the phase difference measuring section 36 also waits for a frame containing reliable data to appear by a predetermined number of times. In the example of FIG. 9, since a frame F28 has reliable data, a displacement between a pulse of the reproduction synchronization signal at the frame F28 and a pulse P27 of the retained phase signal is measured. The phase difference measuring section 36 then outputs the measured displacement as a correction value to a recording control section 23. Other part is the same as that of the above-described first embodiment.

As described above, in the disc recording and reproducing device according to this embodiment, among the reproduction synchronization signals used for measuring the phase difference between the synchronization signals of the recorded data region and the additional data region, only the synchronization signals of the frames containing reliable data are adopted, and the synchronization signals of the frames containing unreliable data are eliminated. Consequently, the reliability of detecting an error of the connection timing between the recorded data and the additional data can be increased. Furthermore, the generation timing and the recording resumption timing of record data can thus be stably corrected based on the measurement result.

It should be noted that, in this embodiment, during the reproduction of the recorded data region, the retained phase signal is outputted when the frame containing reliable record data is detected once, but the retained phase signal may be outputted when the frame containing reliable record data is detected for a predetermined number of times such as twice or three times. Further, during the reproduction of the additional data region, the displacement between the reproduction synchronization signal and the retained phase signal is measured when the frame containing reliable record data is detected once, but the displacement may be measured when the frame containing reliable record data is detected for a predetermined number of times such as twice or three times.

Third Embodiment

Figure 1:
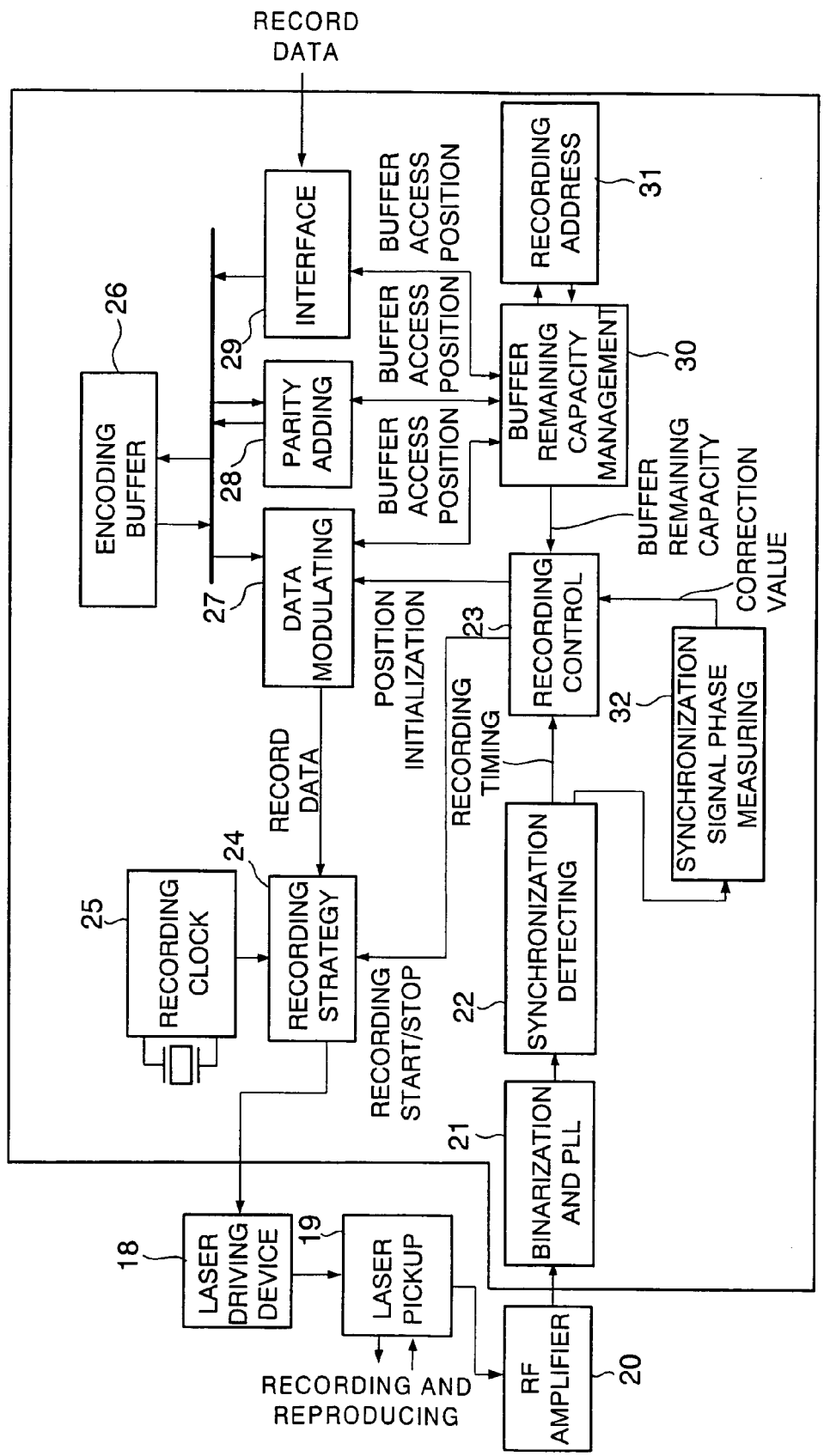
FIG. 1 is a schematic block diagram explaining the configuration of a conventional disc recording and reproducing device.

In a third embodiment, in the disc recording and reproducing device of FIG. 1, a timing that the phase difference measurement period signal for the phase difference measuring section 36 to start operation of measuring a phase difference is inputted to this phase difference measuring section 36 is delayed for a predetermined period from a time that a reproduction of an additional data region is started, so that the reliability of error detection is increased. More details thereof will be explained below.

Figure 10:
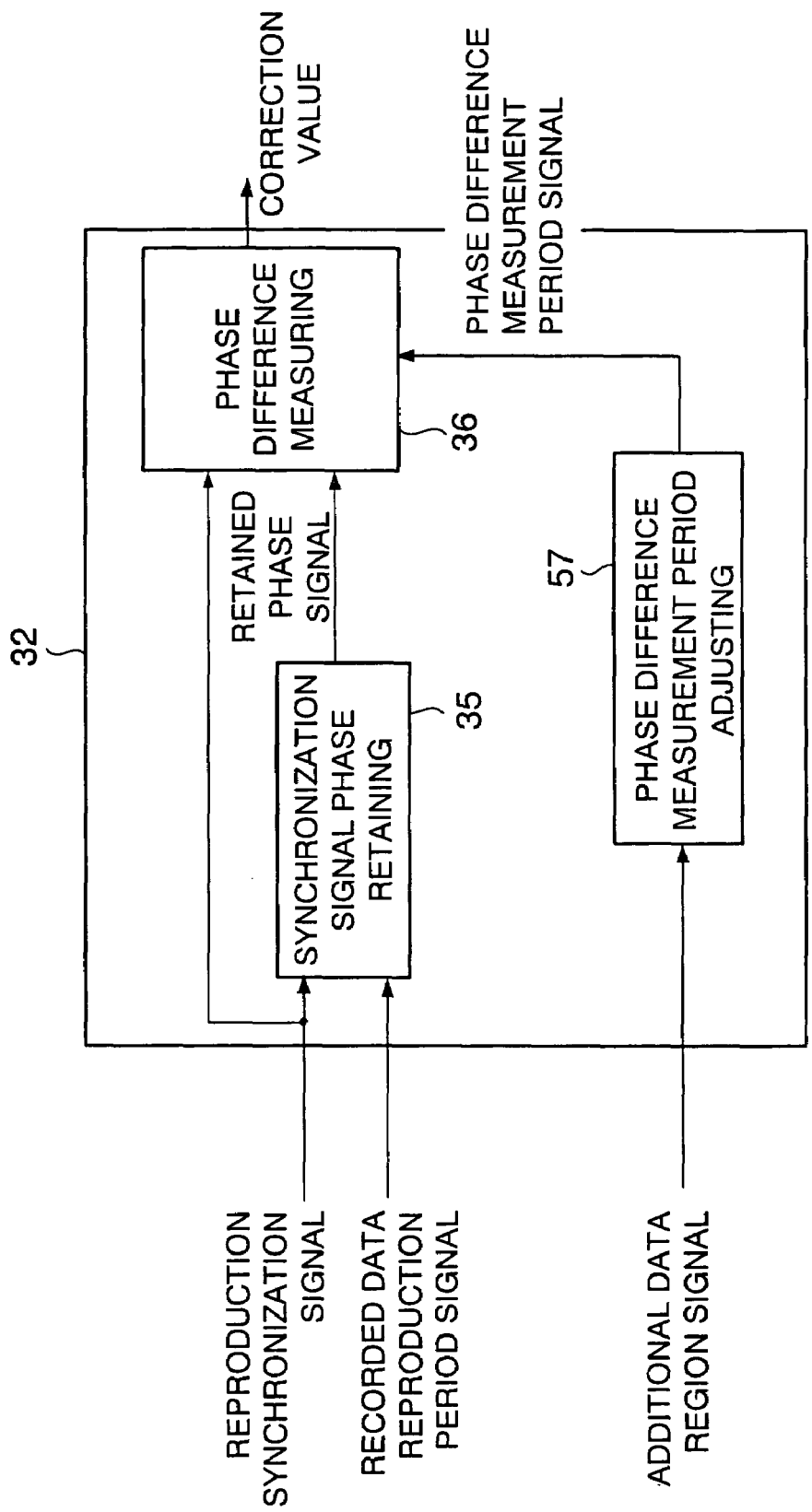
FIG. 10 is a block diagram explaining the configuration of a synchronization signal phase measuring section of a disc recording and reproducing device according to a third embodiment.

FIG. 10 is a block diagram showing the configuration of a synchronization signal phase measuring section 32 according to this embodiment. Note that the configuration of a disc recording and reproducing device according to this embodiment is the same as that shown in above-described FIG. 1.

Figure 2:
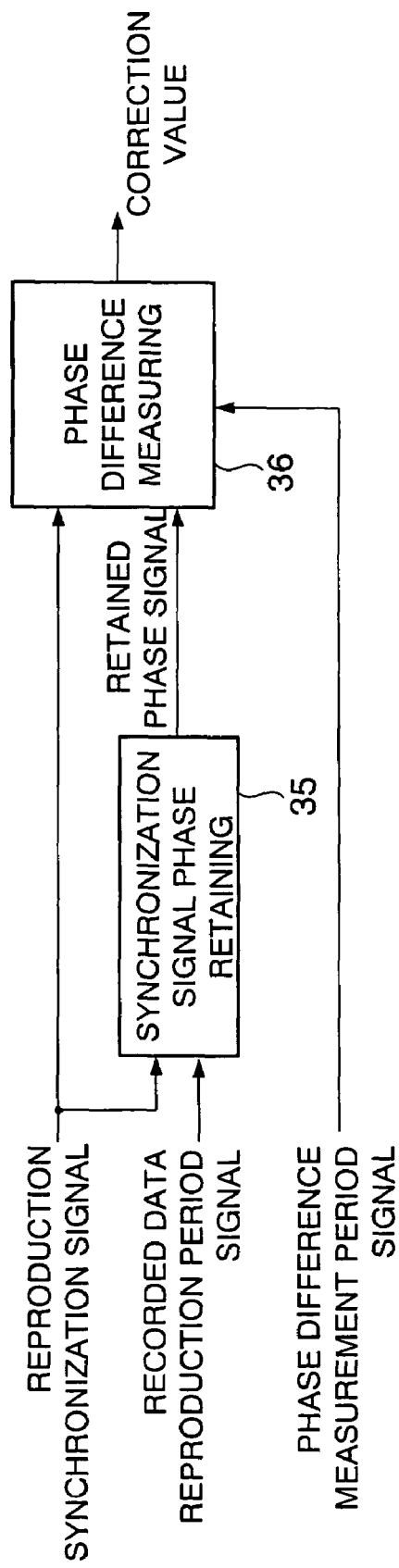
FIG. 2 is a block diagram explaining the configuration of a synchronization signal phase measuring section of FIG. 1.
Figure 3:
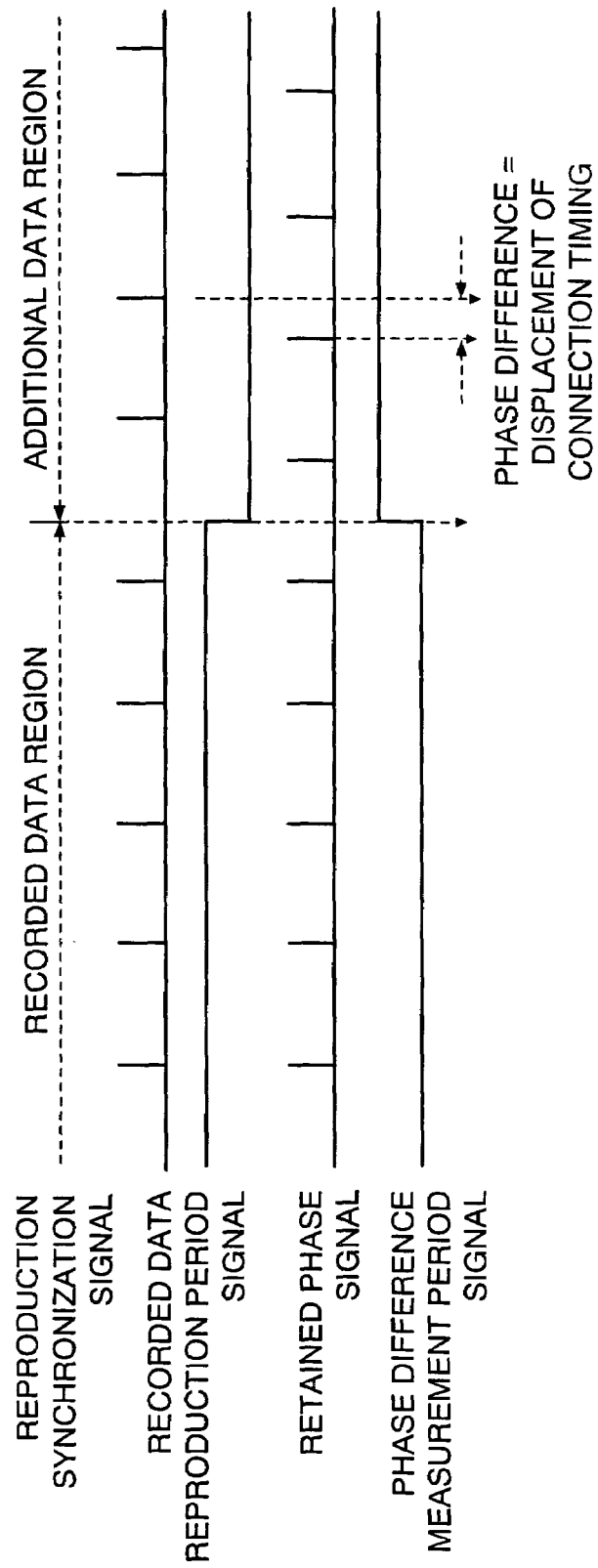
FIG. 3 is a diagram showing one example of operational waveforms of signals inputted to/outputted from the synchronization signal phase measuring section of FIG. 2.

As shown in FIG. 10, the synchronization signal phase measuring section 32 is configured by adding a phase difference measurement period adjusting section 57 to the synchronization signal phase measuring section 32 shown in FIG. 2. In the phase difference measurement period adjusting section 57, an additional data region signal indicating that data is reproduced from an additional data region is inputted. Even when the additional data region signal is inputted, the phase difference measurement period adjusting section 57 delays for a predetermined period (a phase difference non-measurement period), and then outputs the phase difference measurement period signal to the phase difference measuring section 36.

Figure 11:
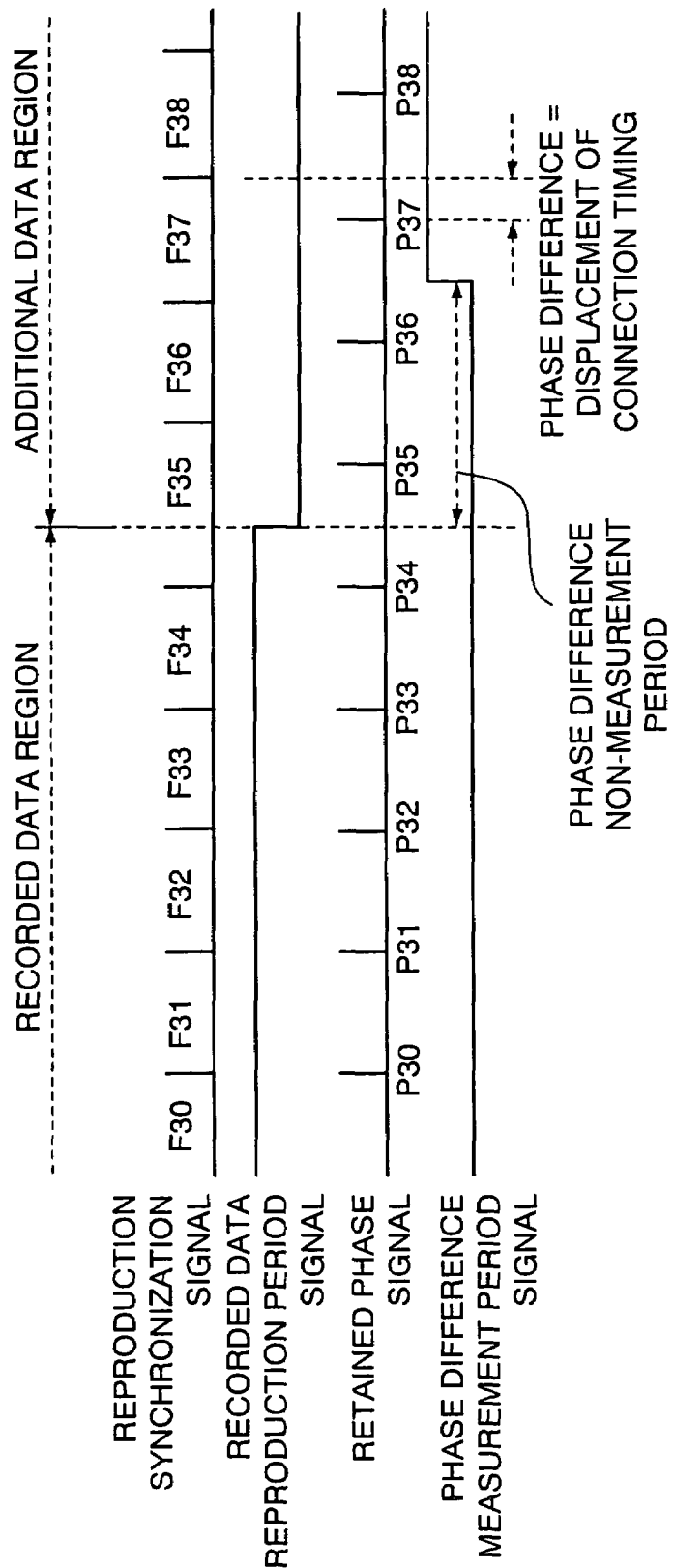
FIG. 11 is a diagram showing one example of operational waveforms of signals inputted to/outputted from the synchronization signal phase measuring section of FIG. 10.

FIG. 11 is a diagram showing one example of a signal timing chart for explaining operation contents of the synchronization signal phase measuring section 32. As shown in FIG. 11, even with a reproduction synchronization signal obtained by reproducing an additional data region, recording or reproducing may be unstable in a region just after an additional recording is started. Accordingly, a predetermined period just after the additional recording is started is defined as a phase difference non-measurement period in this embodiment, and even when a reproduction synchronization signal is detected during this period, this signal is ignored. Then, after this phase difference non-measurement period is passed, and when a frame of the reproduction synchronization signal is detected for a predetermined number of times (once in this embodiment), a displacement between this reproduction synchronization signal and a retained phase signal is measured.

In the example of FIG. 11, frames F35, F36, F37 . . . are sequentially detected as the reproduction synchronization signal after the additional data region is started, but the phase difference non-measurement period is not passed yet at the ends of the frames F35 and F36. Accordingly, at the ends of the frames F35 and F36, the displacement between the reproduction synchronization signal and the retained phase signal is not measured.

At the end of the frame F37, the phase difference non-measurement period is already passed, so that the phase difference measuring section 36 measures a displacement between the end of a frame F38 and a pulse P37 of the retained phase signal. The phase difference measuring section 36 then outputs this measured displacement as a correction value to the recording control section 23.

As described above, in the disc recording and reproducing device according to this embodiment, the displacement of phases between the reproduction synchronization signal and the retained phase signal is not measured during the phase difference non-measurement period just after the record data to be reproduced is switched from the recorded data region to the additional data region. After the phase difference non-measurement period is passed, the stable reproduction synchronization signal is used to measure the displacement between this reproduction synchronization signal and the retained phase signal. Consequently, the reliability of detecting an error of the connection timing between the recorded data and the additional data can be increased. Furthermore, the generation timing and the recording resumption timing of record data can thus be stably corrected based on the measurement result.

Fourth Embodiment

Figure 12:
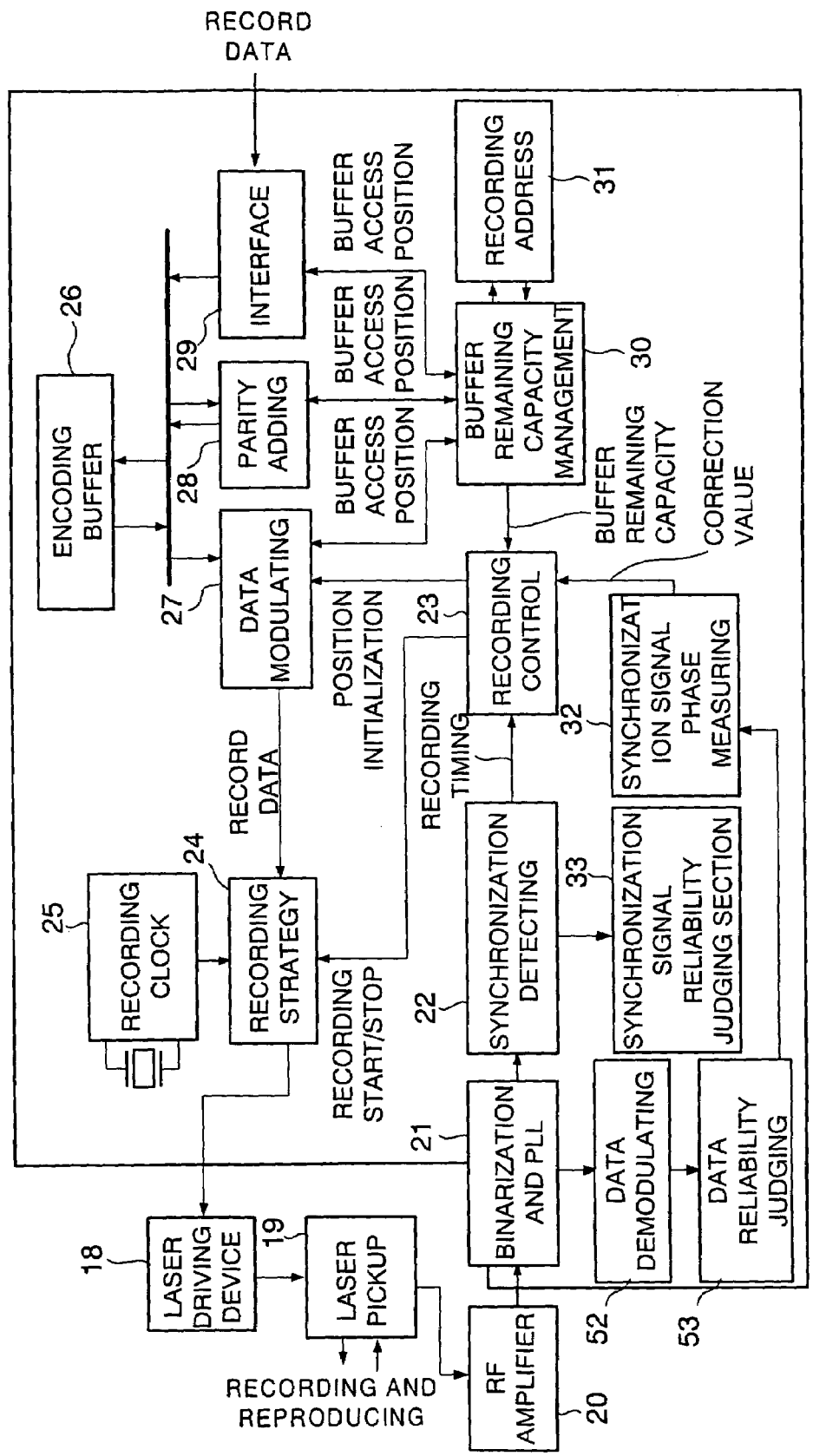
FIG. 12 is a schematic block diagram explaining the configuration of a disc recording and reproducing device according to a fourth embodiment.

In a fourth embodiment, the above-described first to third embodiments are incorporated in one disc recording and reproducing device. FIG. 12 is a block diagram showing the configuration of a disc recording and reproducing device according to this embodiment. As shown in FIG. 12, the disc recording and reproducing device according to this embodiment is configured by adding a synchronization signal reliability judging section 33, a data demodulating section 52, and a data reliability judging section 53 to the disc recording and reproducing device shown in FIG. 1.

Figure 13:
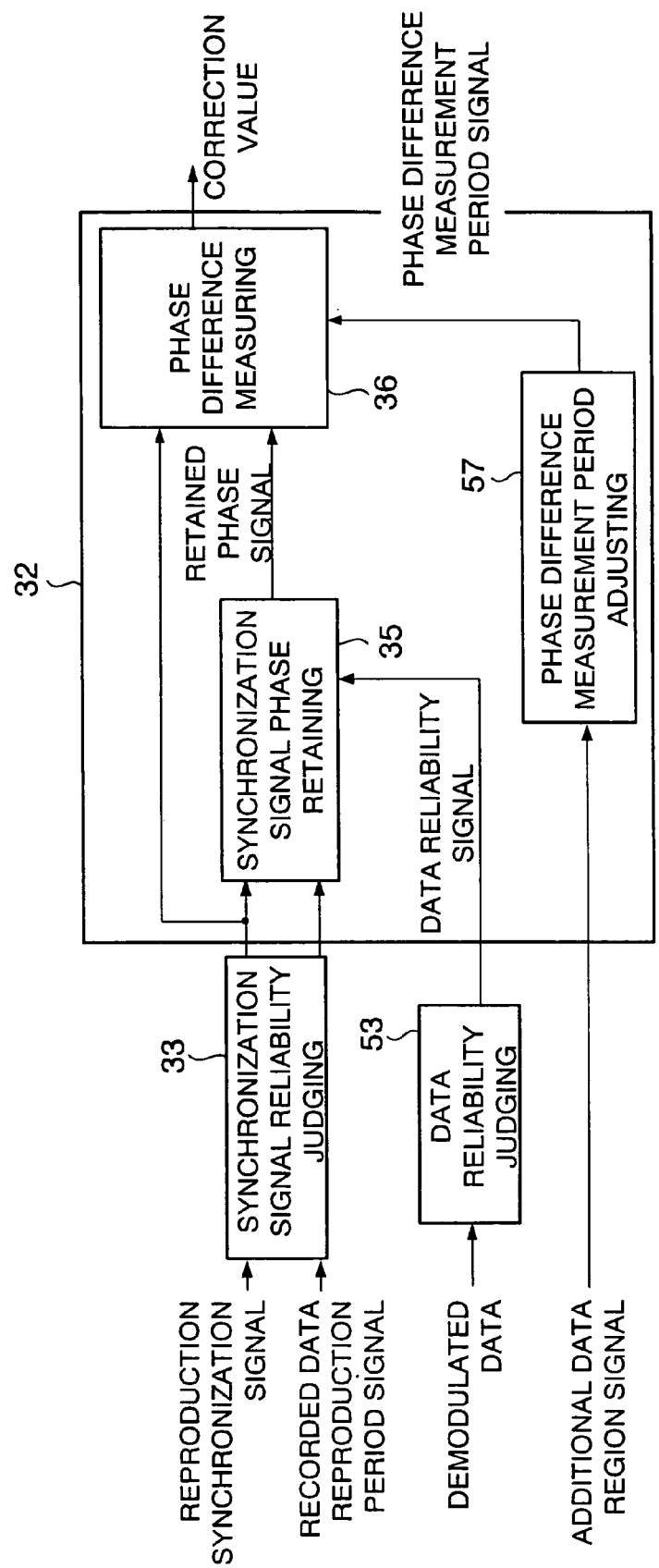
FIG. 13 is a block diagram explaining the configuration of a synchronization signal phase measuring section of FIG. 12.

FIG. 13 is a block diagram showing in more details the configuration of a synchronization signal phase measuring section 32. As shown in FIG. 13, the synchronization signal phase measuring section 32 additionally includes, similarly to the above-described third embodiment, a phase difference measurement period adjusting section 57.

Figure 14:
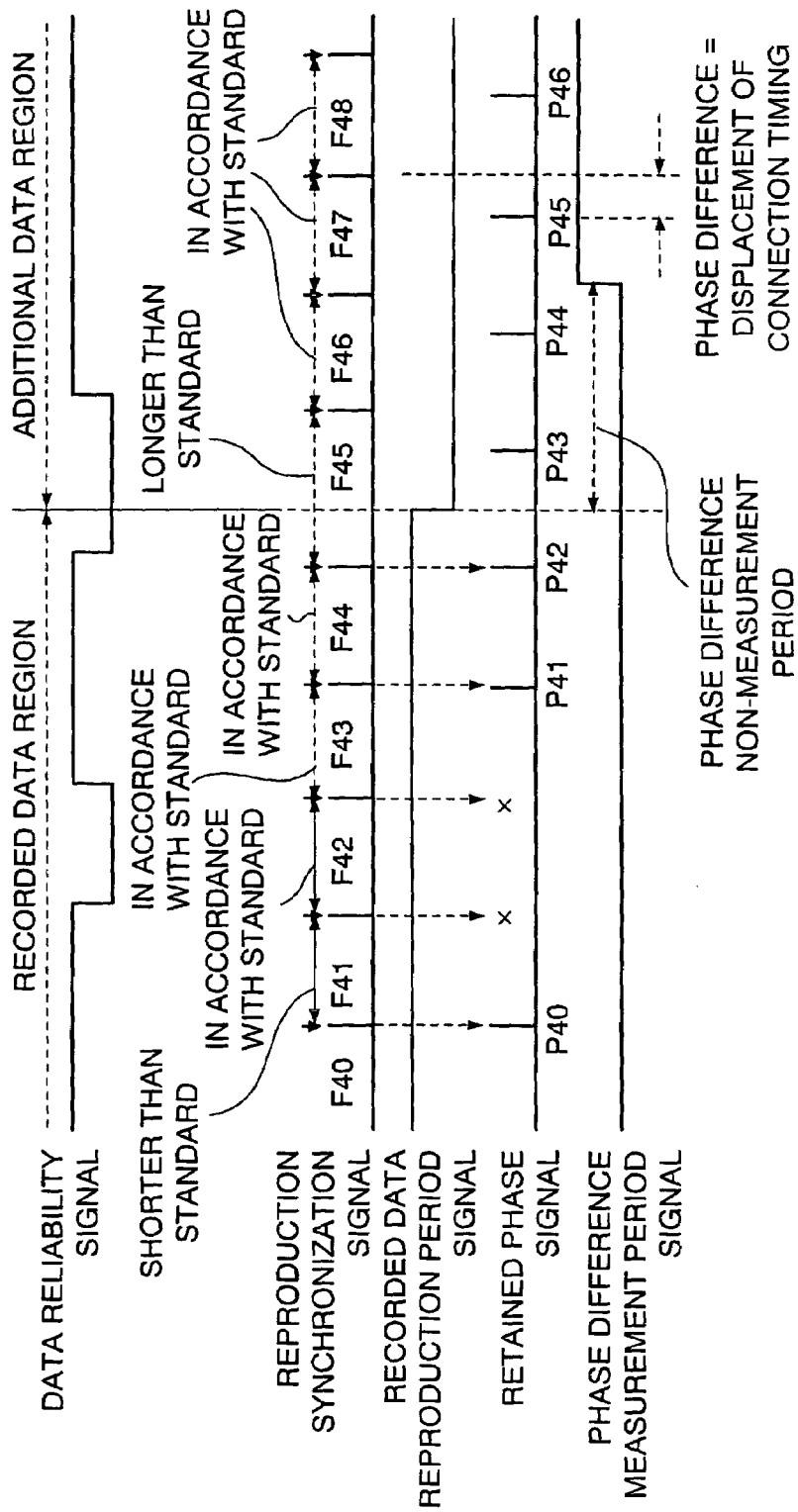
FIG. 14 is a diagram showing one example of operational waveforms of signals inputted to/outputted from a synchronization signal reliability judging section, a data reliability judging section, and the synchronization signal phase measuring section of FIG. 13.

FIG. 14 is a diagram showing one example of a signal timing chart for explaining operation contents of the synchronization signal reliability judging section 33, the data reliability judging section 53, and the synchronization signal phase measuring section 32. As shown in FIG. 14, in this embodiment, even in a reproduction synchronization signal obtained by reproducing record data, when its frame has a length not in accordance with a standard, the reproduction synchronization signal corresponding to this frame is eliminated (frame F41). Further, even in a reproduction synchronization signal obtained by reproducing a recorded data region, a frame containing unreliable data is eliminated by the synchronization signal phase retaining section 35 based on a judgment of the data reliability judging section 53 (frame F42). Further, just after an additional data region is started, the reproduction synchronization signal is ignored until a phase difference non-measurement period is passed (frames F45 and F46). After the phase difference non-measurement period is passed, and after a frame of the reproduction synchronization signal having a period in accordance with a predetermined standard is detected for a predetermined number of times (once in the example in the diagram), a displacement between the end of the frame (frame F47) and a pulse P45 of the retained phase signal is measured.

By combining the above-described three embodiments (the first to third embodiments), the reliability of the connection timing between the recorded data and the additional data can thus be increased.

Fifth Embodiment

In a fifth embodiment, in the above-described first embodiment, a phase difference measurement period measuring section 37 is provided for measuring a period from the start of reproduction of an additional data region until the end of a phase difference measurement, and the measured period is outputted to the recording control section 23 as information indicating reliability of a correction value. More details thereof will be explained below.

Figure 15:
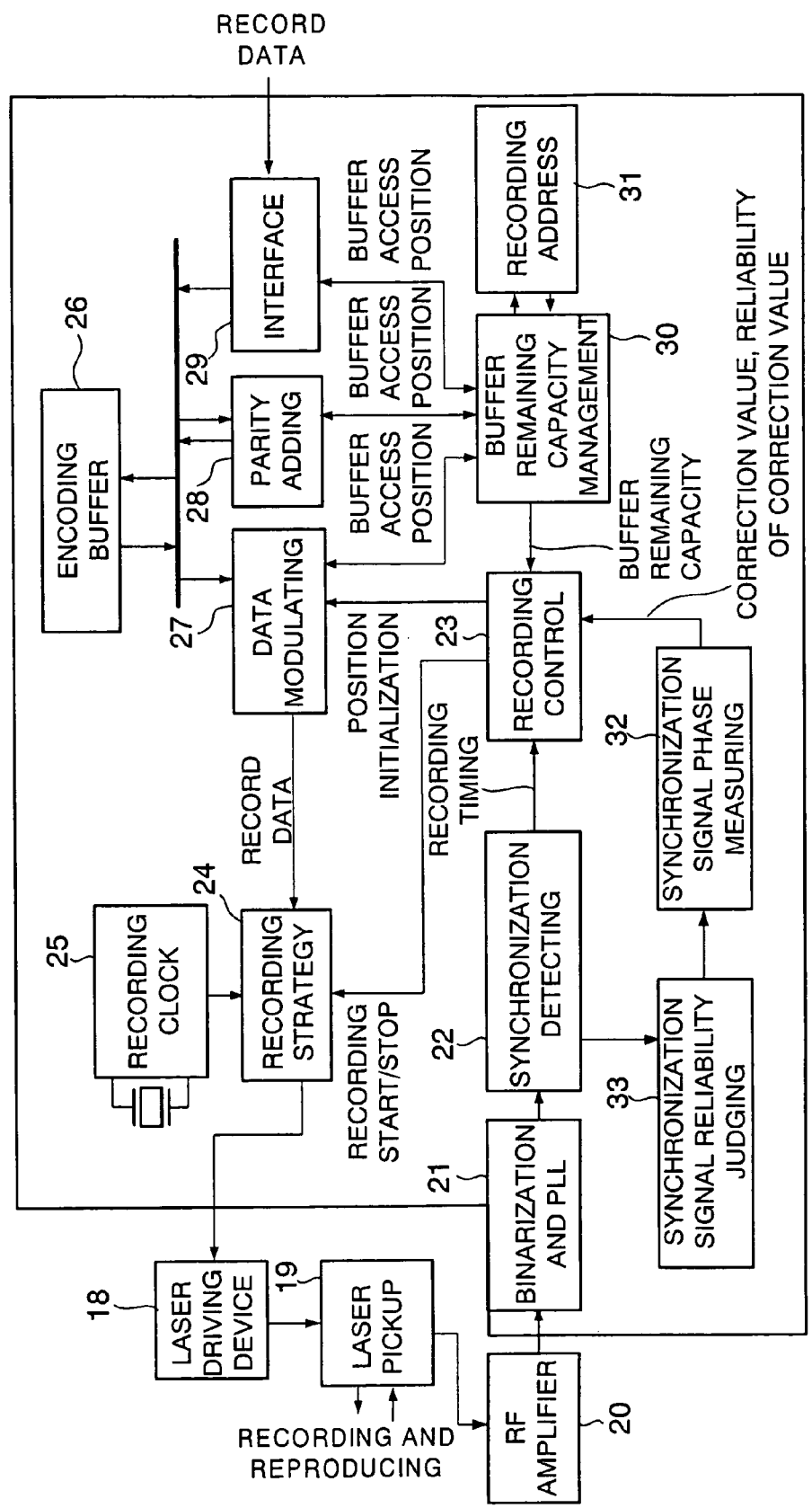
FIG. 15 is a schematic block diagram explaining the configuration of a disc recording and reproducing device according to a fifth embodiment.

FIG. 15 is a schematic block diagram explaining the configuration of a disc recording and reproducing device according to this embodiment, which corresponds to FIG. 4 in the first embodiment. As shown in FIG. 15, in the disc recording and reproducing device according to this embodiment, the information indicating reliability of a corrected value is outputted with the correction value from a synchronization signal phase measuring section 32 to the recording control section 23. This information indicating the reliability of the correction value shows a measurement result of a period (time) from the start of the reproduction of the additional data region until the end of the phase difference measurement. The rest of the configuration is the same as that of the above-described first embodiment.

Figure 16:
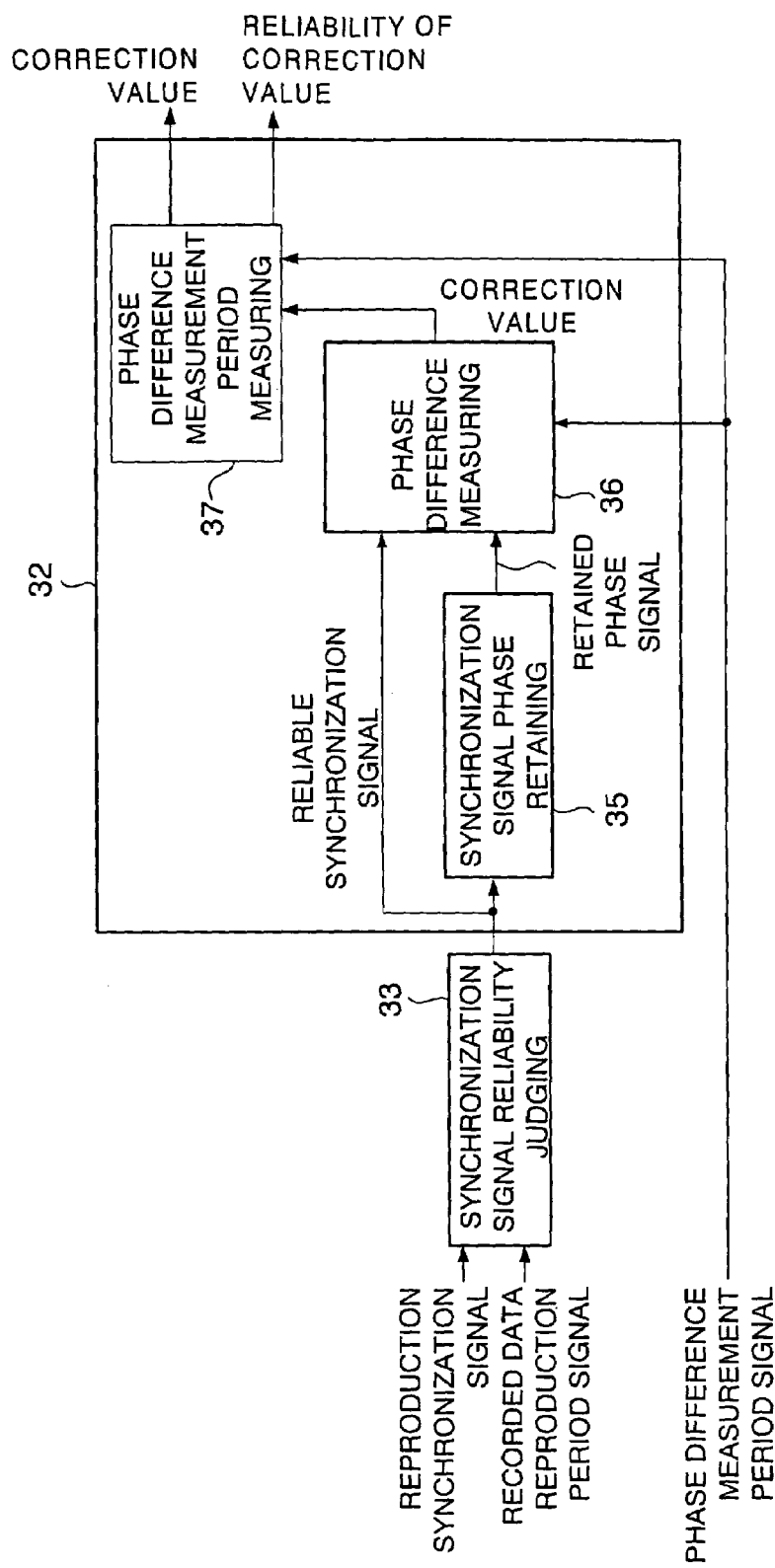
FIG. 16 is a block diagram explaining the configuration of a synchronization signal phase measuring section according to the fifth embodiment.

FIG. 16 is a block diagram explaining the configuration of the synchronization signal phase measuring section 32 according to this embodiment, which corresponds to FIG. 5 in the first embodiment. As shown in FIG. 16, a phase difference measuring section 36 measures, similarly to the above-described first embodiment, a phase difference between a frame having a length in accordance with a standard and a retained phase signal when the reproduction of the additional data region is started, and outputs a displacement thereof as a correction value to the phase difference measurement period measuring section 37. The correction value inputted to this phase difference measurement period measuring section 37 is outputted from this phase difference measurement period measuring section 37 to the recording control section 23.

Further, the phase difference measurement period measuring section 37 measures the measurement period from the start of the reproduction of the additional data region until the end of the measurement of this correction value, and outputs this measurement period as reliability information of the correction value to the recording control section 23. In the recording control section 23, whether or not to perform correction by the measured correction value is determined based on this measurement period. For example, the recording control section 23 may be configured to judge that a disturbance in a frame length is large when the measurement period is longer than a predetermined time so that the correction by the correction value thereof is not performed.

Furthermore, in this embodiment, the device may be configured such that, when the correction value cannot be measured after a predetermined period of time is passed from the start of the reproduction of the additional data region, this measurement is interrupted so that a writing timing of the additional data is not adjusted.

With this configuration, it can be avoided to correct the connection timing between the recorded data and the additional data based on an unreliable correction value. Further, it can be avoided to waste a waiting time for measuring the correction value when the additional data is not correctly written.

Sixth Embodiment

In a sixth embodiment, in the above-described first embodiment, a reproduction abnormality detecting section 38 is provided for detecting a reproduction abnormality during a measurement period based on a synchronization signal in the measurement period. When it is judged that the reproduction abnormality exists during the measurement period, information indicating that a correction value is not reliable is outputted to the recording control section 23.

More details thereof will be explained below.

Note that the configuration of the disc recording and reproducing device according to this embodiment is the same as that of the above-described fifth embodiment.

Figure 17:
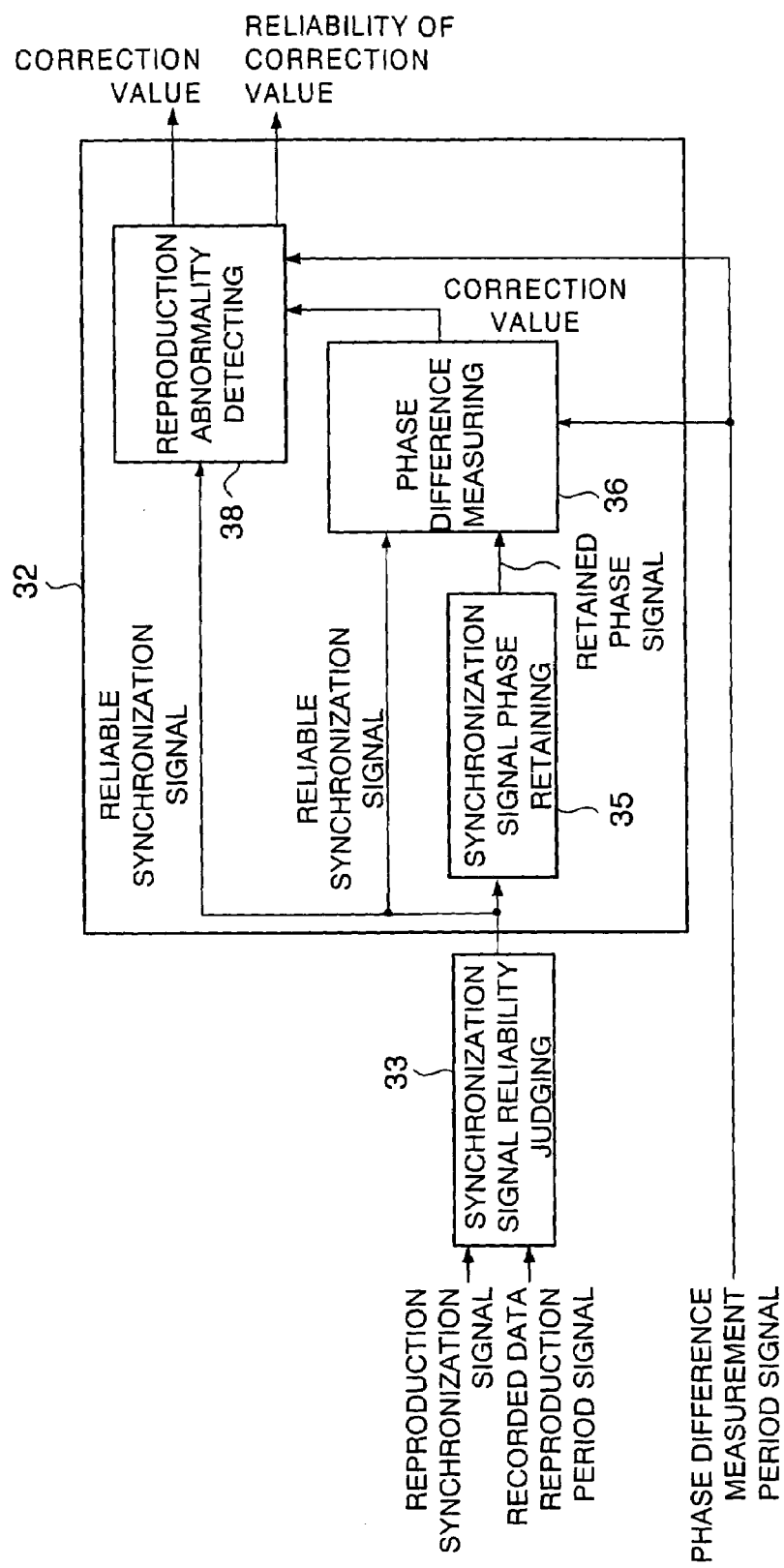
FIG. 17 is a block diagram explaining the configuration of a synchronization signal phase measuring section according to a sixth embodiment.

FIG. 17 is a block diagram explaining the configuration of a synchronization signal phase measuring section 32 according to this embodiment, which corresponds to FIG. 5 in the first embodiment. As shown in FIG. 17, the phase difference measuring section 36 measures, similarly to the above-described first embodiment, a phase difference between a frame having a length in accordance with a standard and a retained phase signal when the reproduction of the additional data region is started, and outputs the displacement thereof as a correction value to the reproduction abnormality detecting section 38. The correction value inputted to this reproduction abnormality detecting section 38 is outputted from this reproduction abnormality detecting section 38 to the recording control section 23.

To the reproduction abnormality detecting section 38, a reliable synchronization signal is inputted from a synchronization signal reliability judging section 33. Based on this reliable synchronization signal, it is judged whether the reproduction abnormality exists or not during the measurement of the correction value. Then, information indicating whether the reproduction abnormality exists or not is outputted as reliability information of the correction value to the recording control section 23.

Whether the reproduction abnormality exists or not is, for example, judged by whether a period in which the reliable synchronization signal cannot be received for a predetermined number of frames or more exists or not. For example, when the reliable synchronization signal cannot be received for a period of five frames or more, the reproduction abnormality detecting section 38 judges that the reproduction abnormality exists.

Further, in this embodiment, the device may be configured such that, when the reproduction abnormality exists in a synchronization signal, the measurement of the correction value is interrupted so that a writing timing of the additional data is not adjusted.

With this configuration, it can be avoided to correct the connection timing between the recorded data and the additional data based on an unreliable correction value. Further, it can be avoided to waste a waiting time for measuring the correction value when the additional data is not correctly written.

It should be noted that the present invention is not limited to the aforementioned embodiments, and various changes may be made therein. For example, the above-described combination of the first to third embodiments is optional, and two embodiments may be combined optionally. In this case, for example, combinations of the first and second embodiments, the first and third embodiments, and the second and third embodiments are conceivable. Further, the fifth embodiment and the sixth embodiment may be applied to the embodiments other than the above-described first embodiment.

What is claimed is:

1. A disc recording and reproducing device, comprising:
    a resuming section which resumes, after writing of record data on a disc is interrupted, writing of the record data, which is continuous to the record data of which writing is interrupted, at an additional data region just after an end of a recorded data region that is a region of the record data already recorded on the disc;
    a first reproduction synchronization signal output section which reproduces the record data recorded on the recorded data region, sequentially extracts a synchronization signal from the reproduced record data, and outputs a first reproduction synchronization signal with a frame having a predetermined length that is sequentially structured by the sequentially extracted synchronization signal;
    a reliability judging section which only detects a frame having a period that is in accordance with a predetermined standard from the first reproduction synchronization signal, and outputs the frame as a reliability synchronization signal;
    a synchronization signal phase retaining section which outputs, based on the frame contained in the reliability synchronization signal, a retained phase signal that retains a phase of the frame of the reliability synchronization signal;
    a second reproduction synchronization signal output section which reproduces the record data recorded on the additional data region, sequentially extracts the synchronization signal from the reproduced record data, and outputs a second reproduction synchronization signal with a frame having a predetermined length that is sequentially structured by the sequentially extracted synchronization signal; and
    a phase difference measuring section which measures a displacement of frames between the second reproduction synchronization signal and the retained phase signal, as a phase difference.

2. The disc recording and reproducing device according to claim 1, wherein the reliability judging section outputs the reliability synchronization signal when the frame having the period that is in accordance with the predetermined standard is detected from the first reproduction synchronization signal for a predetermined number of times.

3. The disc recording and reproducing device according to claim 2, wherein the phase difference measuring section measures the displacement of the frames between the second reproduction synchronization signal and the retained phase signal as the phase difference, when the frame having the period that is in accordance with the predetermined standard is detected from the second reproduction synchronization signal for a predetermined number of times.

4. The disc recording and reproducing device according to claim 1, wherein the phase difference measuring section outputs the measured phase difference between the second reproduction synchronization signal and the retained phase signal as a correction value; and
    the disc recording and reproducing device further comprises a recording control section which adjusts a timing to write the record data on the additional data region based on the correction value.

5. The disc recording and reproducing device according to claim 4, further comprising a phase difference measurement period measuring section which measures a period from a start of the reproduction of the additional data region until the phase difference is measured, as a measurement period, wherein the recording control section judges whether or not to adjust the timing to write the record data on the additional data region based on the measurement period.

6. The disc recording and reproducing device according to claim 4, wherein the measurement of the phase difference is interrupted and the recording control section does not adjust the timing to write the record data, when the phase difference is still not measured after a predetermined period or longer is passed from the start of the reproduction of the additional data region.

7. The disc recording and reproducing device according to claim 4, further comprising are production abnormality detecting section which detects whether or not an abnormality exists in a reproduction state of the reproduced synchronization signal,
wherein the recording control section does not adjust the timing to write the record data on the additional data region when the abnormality is detected in the reproduction state of the synchronization signal while measuring the phase difference.

8. A disc recording and reproducing device, comprising:
a resuming section which resumes, after writing of record data on a disc is interrupted, writing of the record data, which is continuous to the record data of which writing is interrupted, at an additional data region just after an end of a recorded data region that is a region of the record data already recorded on the disc;
a first reproduction synchronization signal output section which reproduces the record data recorded on the recorded data region, sequentially extracts a synchronization signal from the reproduced record data, and outputs a first reproduction synchronization signal with a frame having a predetermined length that is sequentially structured by the sequentially extracted synchronization signal;
a data reliability judging section which only detects a frame containing reliable record data from the first reproduction synchronization signal, and outputs the frame as a reliability synchronization signal;
a synchronization signal phase retaining section which outputs, based on the frame contained in the reliability synchronization signal, a retained phase signal that retains a phase of the frame;
a second reproduction synchronization signal output section which reproduces the record data recorded on the additional data region, sequentially extracts a synchronization signal from the reproduced record data, and outputs a second reproduction synchronization signal with a frame having a predetermined length that is sequentially structured by the sequentially extracted synchronization signal; and
a phase difference measuring section that measures a displacement of frames between the second reproduction synchronization signal and the retained phase signal, as a phase difference.

9. The disc recording and reproducing device according to claim 8, wherein the data reliability judging section outputs the reliability synchronization signal when the frame containing the reliable data is detected from the first reproduction synchronization signal for a predetermined number of times.

10. The disc recording and reproducing device according to claim 9, wherein the phase difference measuring section measures the displacement of the frames between the second reproduction synchronization signal and the retained phase signal as the phase difference, when the frame containing the reliable data is detected from the second reproduction synchronization signal for a predetermined number of times.

11. The disc recording and reproducing device according to claim 8, wherein the phase difference measuring section outputs the measured phase difference between the second reproduction synchronization signal and the retained phase signal as a correction value; and
the disc recording and reproducing device further comprises a recording control section which adjusts a timing to write the record data on the additional data region based on the correction value.

12. The disc recording and reproducing device according to claim 11, further comprising a phase difference measurement period measuring section which measures a period from a start of the reproduction of the additional data region until the phase difference is measured, as a measurement period,
wherein the recording control section judges whether or not to adjust the timing to write the record data on the additional data region based on the measurement period.

13. The disc recording and reproducing device according to claim 11, wherein the measurement of the phase difference is interrupted and the recording control section does not adjust the timing to write the record data, when the phase difference is still not measured after a predetermined period or longer is passed from the start of the reproduction of the additional data region.

14. The disc recording and reproducing device according to claim 11, further comprising a reproduction abnormality detecting section which detects whether or not an abnormality exists in a reproduction state of the reproduced synchronization signal,
wherein the recording control section does not adjust the timing to write the record data on the additional data region when the abnormality is detected in the reproduction state of the synchronization signal while measuring the phase difference.

15. A disc recording and reproducing device, comprising:
a resuming section which resumes, after writing of record data on a disc is interrupted, writing of the record data, which is continuous to the record data of which writing is interrupted, at an additional data region just after an end of a recorded data region that is a region of the record data already recorded on the disc;
a first reproduction synchronization signal output section which reproduces the record data recorded on the recorded data region, sequentially extracts a synchronization signal from the reproduced record data, and outputs a first reproduction synchronization signal with a frame having a predetermined length that is sequentially structured by the sequentially extracted synchronization signal;
a synchronization signal phase retaining section which outputs, based on the frame contained in the first reproduction synchronization signal, a retained phase signal that retains a phase of the frame;
a second reproduction synchronization signal output section which reproduces the record data recorded on the additional data region, sequentially extracts a synchronization signal from the reproduced record data, and outputs a second reproduction synchronization signal with a frame having a predetermined length that is sequentially structured by the sequentially extracted synchronization signal; and
a phase difference measuring section which measures a displacement of frames between the second reproduction synchronization signal and the retained phase signal as a phase difference, after a predetermined period is passed after the reproduction of the record data recorded on the additional data region is started.

16. The disc recording and reproducing device according to claim 15, wherein the phase difference measuring section measures the displacement of the frames between the second reproduction synchronization signal and the retained phase signal as the phase difference, when a frame of the reproduction synchronization signal having a period that is in accordance with a predetermined standard is detected after the predetermined period is passed.

17. The disc recording and reproducing device according to claim 15, wherein the phase difference measuring section outputs the measured phase difference between the second reproduction synchronization signal and the retained phase signal as a correction value; and the disc recording and reproducing device further comprises a recording control section which adjusts a timing to write the record data on the additional data region based on the correction value.

18. The disc recording and reproducing device according to claim 17, further comprising a phase difference measurement period measuring section which measures a period from a start of the reproduction of the additional data region until the phase difference is measured, as a measurement period, wherein the recording control section judges whether or not to adjust the timing to write the record data on the additional data region based on the measurement period.

19. The disc recording and reproducing device according to claim 17, wherein the measurement of the phase difference is interrupted and the recording control section does not adjust the timing to write the record data, when the phase difference is still not measured after a predetermined period or longer is passed from the start of the reproduction of the additional data region.

20. The disc recording and reproducing device according to claim 17, further comprising a reproduction abnormality detecting section which detects whether or not an abnormality exists in a reproduction state of the reproduced synchronization signal, wherein the recording control section does not adjust the timing to write the record data on the additional data region when the abnormality is detected in the reproduction state of the synchronization signal while measuring the phase difference.

* * * * *